United States Patent [19]
Gliebe et al.

[11] Patent Number: 5,169,288
[45] Date of Patent: Dec. 8, 1992

[54] LOW NOISE FAN ASSEMBLY

[75] Inventors: Philip R. Gliebe, Waynesville; Patrick Y. S. Ho, Cincinnati, both of Ohio

[73] Assignee: General Electric Company, Cincinnati, Ohio

[21] Appl. No.: 756,104

[22] Filed: Sep. 6, 1991

[51] Int. Cl.⁵ .......................................... F01D 25/04
[52] U.S. Cl. ................................................ 415/119
[58] Field of Search ............... 415/119, 199.4, 199.5; 416/DIG. 2

[56] References Cited

U.S. PATENT DOCUMENTS

| | | | |
|---|---|---|---|
| 3,194,487 | 7/1965 | Tyler et al. | 230/122 |
| 3,270,953 | 9/1966 | Jerie et al. | 230/120 |
| 3,574,477 | 4/1971 | McAlister et al. | 415/60 |
| 3,747,343 | 7/1973 | Rosen | 60/226 R |
| 3,883,264 | 5/1975 | Rao | 415/119 |
| 4,131,387 | 12/1978 | Kazin et al. | 415/119 |
| 4,883,240 | 11/1989 | Adamson et al. | 244/69 |

OTHER PUBLICATIONS

Tyler et al., "Axial Flow Compressor Noise Studies," SAE Transactions, 1961, pp. i-v, 1-41, FIGS. 1-22 and appendices I-III.
R. A. Kantola et al.,"Effects of Vane/Blade Ratio and Spacing on Fan Noise," paper AIAA-81-2033, Oct. 1981, pages:cover, and 1-15.

*Primary Examiner*—Edward K. Look
*Assistant Examiner*—Michael S. Lee
*Attorney, Agent, or Firm*—Jerome C. Squillaro

[57] ABSTRACT

A gas turbine engine rotor assembly such as a fan or compressor includes rotor blades spaced axially from stator vanes inside an annular duct. The number of vanes is selected for a predetermined number of blades for obtaining substantially equal values of a cut-off ratio for at least two blade passing frequency harmonics for reducing spinning mode noise from the duct.

14 Claims, 4 Drawing Sheets

LOW NOISE FAN ASSEMBLY

TECHNICAL FIELD

The present invention relates generally to gas turbine engines, and, more specifically, to improved fans and compressors thereof having reduced noise.

BACKGROUND ART

A gas turbine engine such as a turbojet or turbofan engine powering an aircraft from takeoff through flight, approach, and landing produces noise from the air being compressed therein and from the air and combustion gases being discharged therefrom. Fans and compressors include at least one row of a plurality of circumferentially spaced apart rotor blades for compressing air channeled therethrough followed in turn by a row of circumferentially spaced apart stator vanes. The rotor blades rotate about a longitudinal centerline axis of the engine at a rotational speed N and effect a blade passing frequency (BPF) which is the product of the rotational speed N and the number B of rotor blades. Air channeled between the blades and vanes and inside the duct surrounding the blades and vanes generates conventionally known discrete frequency spinning mode tones or noises within the duct.

Spinning mode noise is conventionally known to include rotating pressure fields caused by both rotation of the rotor blades themselves, and by interaction of the rotor blades with adjacent stator vanes. The spinning mode tones are discharged from the engine either upstream through the duct inlet or downstream through the duct outlet, or both and are radiated toward the ground upon takeoff or landing of an aircraft being powered by the engine. The spinning mode tones occur at discrete frequencies including the fundamental blade passing frequency BPF, alternatively referred to herein as the first harmonic, and higher order frequencies including the second, third and higher harmonics.

In order to reduce the spinning mode noises, at takeoff or approach for example, it is known to selectively determine the number of vanes relative to the number of blades, preferentially space the vanes from the blades, and provide noise suppression liners along the inner wall of the duct surrounding the blades and vanes. These solutions decrease the magnitude of the spinning mode noises either at their inception, or after they are generated by being suitably absorbed into the suppression liner. In order to reduce the noise at its source, a conventionally known cut-off parameter, or ratio, is used wherein the values thereof less than 1.0 will effect decay of the noise, and values 1 or greater will effect propagation of the noise through the length of the duct with essentially undiminished intensity which will therefore radiate from the duct into the ambient air and toward the ground resulting in community noise.

In order to ensure the decay of spinning mode noise, it is conventionally known to select the number of vanes V to be greater than or equal to twice the product of the number of blades B and the blade passing frequency harmonic number (n). For example, to ensure decay of the spinning mode tone associated with the fundamental blade passing frequency BPF, i.e. harmonic number $n=1$, the number of vanes V should be greater than or equal to twice the number of blades B. And, to ensure decay of the spinning mode tones for the fundamental and second harmonic, the number of vanes V should be greater than or equal to four times the number of blades B.

However, for modern high by-pass turbofan engines requiring a relatively large number of rotor blades, the resulting number of stator vanes becomes impractically high. Accordingly, conventional practice is to select the number of stator vanes to cut-off the fundamental spinning mode noise at the fundamental blade passing frequency BPF only. Although the BPF tone levels are reduced, the higher harmonic tone levels are relatively high and the conventional sound suppression liners are less effective in attenuating these tones since the energy thereof is directed primarily along the engine longitudinal axis.

OBJECTS OF THE INVENTION

Accordingly, it is one object of the present invention to provide a new and improved fan assembly effective for reducing spinning mode noise levels at harmonics above the fundamental blade passing frequency.

Another object of the present invention is to provide a new and improved fan assembly effective for reducing spinning mode noise without significantly increasing the number of stator vanes compared to the number of rotor blades.

Another object of the present invention is to provide a new and improved fan assembly having an optimum ratio of the number of stator vanes to rotor blades for reducing spinning mode noise.

DISCLOSURE OF INVENTION

A gas turbine engine rotor assembly such as a fan or compressor includes a plurality of rotor blades spaced axially from a plurality of stator vanes inside an annular duct. The number of vanes is selected for a predetermined number of blades for obtaining substantially equal values of a cut-off ratio for at least two blade passing frequency harmonics for reducing spinning mode noise from the duct.

BRIEF DESCRIPTION OF DRAWINGS

The novel features characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
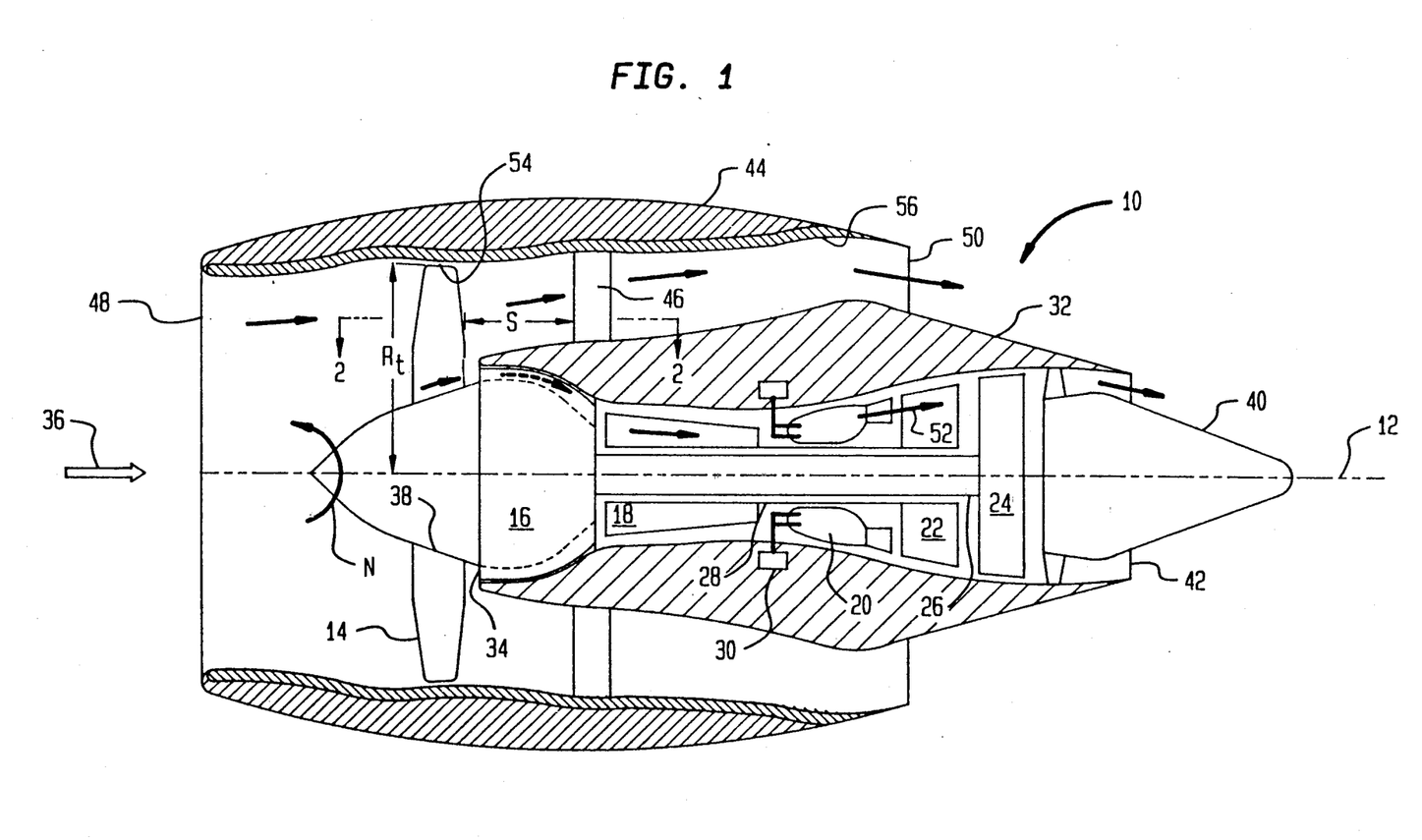
FIG. 1 is a longitudinal sectional, schematic representation of an exemplary high bypass turbofan gas turbine engine having a fan assembly in accordance with one embodiment of the present invention.

Illustrated in FIG. 1 is an exemplary gas turbine engine 10, such as a high bypass turbofan engine, effective for powering an aircraft (not shown) in flight from takeoff through cruise, approach, and landing. The engine 10 includes in serial flow communication about a longitudinal centerline axis 12 a fan having a plurality of circumferentially spaced apart fan, or rotor, blades 14, a conventional low pressure compressor (LPC) 16, a conventional high pressure compressor (HPC) 18, a conventional annular combustor 20, a conventional high pressure turbine (HPT) 22, and a conventional low pressure turbine (LPT) 24. The LPT 24 is fixedly connected to both the LPC 16 and the fan blades 14 by a first rotor shaft 26, and the HPT 22 is fixedly connected to the HPC 18 by a second rotor shaft 28. Conventional fuel injecting means 30 are provided for selectively injecting fuel into the combustor 20 for powering the engine 10.

A conventional annular casing 32 surrounds the engine 10 from the LPC 16 to the LPT 24, and defines with the LPC 16 and LPC inlet 34 for receiving a portion of ambient air 36 from the blades 14 adjacent to the blade roots 38 thereof. The downstream end of the casing 32 defines with a conventional annular exhaust plug 40 an annular exhaust outlet 42.

Surrounding the blades 14 and the upstream portion of the casing 32 is a conventional annular duct, or nacelle, 44 which is conventionally spaced radially outwardly from the casing 32 for allowing the radially outer portion of the air 36 channeled past the blades 14 to flow therethrough. A plurality of circumferentially spaced apart conventional outlet guide vanes (OGVs), or stator vanes, 46 extend radially between the casing 32 and the nacelle 44 and are spaced axially downstream from the blades 14 at an axial distance S, as shown in more particularity in FIG. 2. The nacelle 44 includes an inlet 48 at its upstream end for receiving the ambient air 36, and an outlet 50 for discharging the portion of the air 36 channeled from the blades 14 and past the OGVs 46 for providing a majority of thrust from the engine 10 for powering the aircraft.

During operation of the engine 10, the fan blades 14 and the rotor blades of the LPC 16 (not shown) are caused to rotate at a rotational speed N about the centerline axis 12 by the LPT 24. A portion of the air 36 passes through the fan blades 14 near their roots 38 and into the LPC inlet 34 for being further compressed by the LPC 16, and in turn yet further compressed by the HPC 18 and channeled to the combustor 20. Fuel is added by the fuel injecting means 30 to the compressed air 36 in the combustor 20 and conventionally ignited for generating combustion gases 52. The combustion gases 52 are channeled from the combustor 20 to the HPT 22 for powering the HPC 18, and are then channeled to the LPT 24 for powering the fan blades 14 and the LPC 16. The gases 52 are then discharged from the exhaust outlet 42. The radially outer portion of the air 36 which does not enter the LPC inlet 34 is compressed by the fan blades 14 and channeled past the OGVs 46 within the nacelle 44 and discharged from the outlet 50 for providing thrust to power the aircraft.

It is conventionally known that rotating rotor blades of a gas turbine engine fan or compressor generate noise which extends either upstream or downstream therefrom, or both, which noise may be sufficiently loud, especially during takeoff or approach operation of the engine 10, for being objectionable. In accordance with the present invention, an improved method and apparatus are disclosed for reducing rotor blade generated noise from the engine 10 such as that from the fan blades 14 or the rotor blades of the LPC 16. However, the present invention will be described in particular with respect to the fan blades 14, with it being understood that it may also be practiced by those skilled in the art from the teachings herein to other types and configurations of rotor blades having adjacent stator vanes such as in fans and compressors.

The noises generated by the fan blades 14 specifically addressed by the present invention are conventionally known as discrete frequency spinning mode noises, or tones, which are rotating pressure fields, or wakes, caused by the rotating fan blades 14 by themselves, and additionally by their interaction with the downstream adjacent OGVs 46. The spinning mode noises conventionally include both fundamental and harmonics thereof. More specifically, spinning mode noise is generated by the fan blades 14 at the fundamental fan blade passing frequency BPF and the higher harmonics thereof. It is conventionally known during the design of a gas turbine engine to initially select a number B representing the total number of fan blades 14 and then select a number V representing the total number of OGVs 46 based on conventional criteria for reducing the spinning mode noises. Given the number B of fan blades 14, the blade passing frequency BPF is simply the product of the number of blades B and the rotational speed N of the fan blades 14 about the centerline axis 12, i.e. $B \times N$. The harmonics thereof are represented by an integer harmonic number $n = 1, 2, 3, \ldots$, wherein the first harmonic ($n=1$) is the same as the fundamental blade passing frequency BPF, with the second harmonic ($n=2$) having twice the frequency thereof and so on for the higher order harmonics.

The principles upon which this invention are based are those governing the propagation and radiation of discrete tone noise, such as the spinning mode noises, in an annular duct such as the nacelle 44. For the numbers V of OGVs 46 and B of fan blades 14, the discrete tone noise of interest includes the superposition of pressure patterns represented by a spinning mode number m, i.e.

$$m = nB - kV \quad (1)$$

wherein n is the blade passing frequency harmonic integer number which is equal to $1, 2, 3, \ldots$, and k is an index number that may take on all positive and negative integers, e.g. plus or minus $1, 2, 3, \ldots$ As shown in FIG. 1, the fan blades 14 also include a radially outer tip 54 which is disposed at a tip radius $R_t$ from the centerline axis 12, which upon rotation at the rotational speed N has a tip speed mach number $M_t$ represented as follows:

$$M_t = 2\pi N R_t / 60 A_o \quad (2)$$

where $A_o$ is a constant representing the conventionally determined sonic velocity of the air 36 within the nacelle 44.

The flow of the air 36 through the nacelle 44 from the inlet 48 to the outlet 50 has a speed at given engine operating conditions of interest such as at takeoff or approach power settings of the engine 10 which may be represented by its mach number $M_a$ as follows:

$$M_a = V_a / A_o \quad (3)$$

wherein $V_a$ is the given velocity of the air 36 flowing through the nacelle 44 from the inlet 48 to the outlet 50.

According to conventional practice, the number V of OGVs 46 is selected relative to a predetermined number B of the fan blades 14 for obtaining conventionally known cut-off of the spinning mode noise generated by the fan blades 14 at the operating condition of interest. Cut-off is a conventionally known concept which represents a point below which a discrete spinning mode tone, or noise at a specific frequency, will decay, and at or above which the spinning mode tone will propagate through the length of the nacelle 44 and radiate outwardly from the inlet 48 or the outlet 50, or both into the free air which during takeoff or landing of the aircraft may be unacceptably loud to listeners in the community. Since the spinning mode noise occurs at several harmonics, a respective cut-off point is associated with each of the harmonics. It is conventionally known, for example, that in order to obtain cut-off of spinning mode tone harmonics up to the harmonic n, the number of stator vanes V should be selected to be equal to or greater than twice the number of rotor blades B times the harmonic number n. For the fundamental blade passing frequency BPF, V would be selected to equal 2B. For obtaining cut-off through the second harmonic, the number of vanes V would be equal to or greater than 4B and so on. However, for modern high bypass turbofan engines, the required number of stator vanes V, i.e. 4B, is an impractically large number of vanes and would not ordinarily be used in an engine design.

Accordingly, selecting the number of vanes V required solely for obtaining cut-off of the fundamental BPF spinning mode tone fails to address the higher harmonic spinning mode tones which typically will propagate and radiate from the nacelle 44 with relatively high energy and magnitude. Although the nacelle 44 as illustrated in FIG. 1 typically includes a conventional sound suppression liner 56, such liner 56 is typically tuned for specific tones and is less effective in attenuating the higher harmonic spinning mode tones which propagates energy in an axial direction parallel to the centerline axis 12 in conventionally known plane-wave modes. An investigation in how to reduce these higher harmonic spinning mode tone levels and make them more amenable to suppression by the duct liner 56 led to the discovery of the present invention.

The principle employed in developing the present invention is that cut-off as represented by a cut-off parameter or ratio K uniquely defines the propagation and radiation characteristic of each spinning mode tone. The cut-off ratio K may alternatively be considered to represent the ratio of a sound frequency to the frequency that just begins to propagate in the duct. For particular spinning modes m with a cut-off ratio K less than 1.0, the spinning mode tone will decay, and for values equal to or greater than 1.0, the spinning mode tone will propagate through the nacelle 44 and radiate outwardly therefrom. The greater the value of K, the more aligned with the centerline 12 the sound propagation direction becomes, and the smaller the residence time of the sound wave inside the nacelle 44 becomes before radiating from the nacelle 44. Furthermore, the larger the value of the cut-off ratio K, the smaller is the amount of attenuation produced by the suppression liner 56.

The cut-off ratio K may have various representations, with the following representation being particularly useful in uncovering and defining the present invention:

$$K = \frac{nB}{|m|} \frac{(M_t)}{(1 - M_a^2)^{\frac{1}{2}}} \quad (4)$$

Equation (4) shows that the cut-off ratio K is proportional to the blade passing frequency harmonic number n, the blade number B which is predetermined based on conventional design practice, the absolute value of the spinning mode number m, and the speed of the fan blade tips 54 relative to the speed of the flow of the air 36 through the nacelle 44 which is represented, for example, by the expression $M_t/(1-M_a)^{\frac{1}{2}}$.

Figure 3:
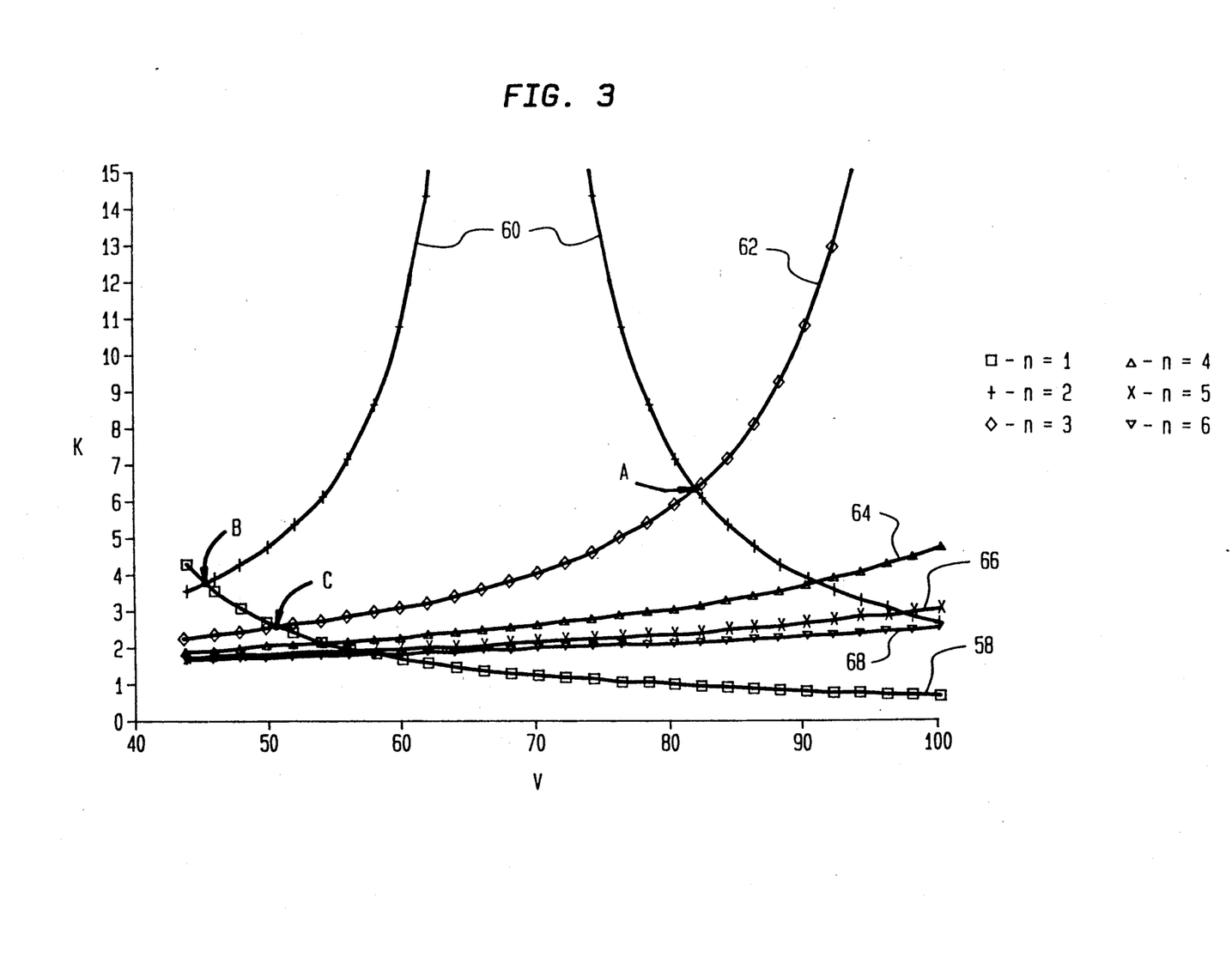
FIG. 3 is a graph plotting cut-off ratio K versus vane number V for six harmonic spinning modes for 34 rotor blades.

In order to visualize the significance of the present invention, the cut-off ratio K has been plotted as the ordinate in the graph illustrated in FIG. 3 versus the vane number V on the abscissa for an exemplary number of blades B, i.e. 34. Plotted is the cut-off ratio K for each of the first six BPF harmonic numbers n associated with the respective spinning mode tones, having respective first, second, third, fourth, fifth, and sixth cut-off ratios curves 58, 60, 62, 64, 66, and 68. The value of the integer k used in the spinning mode number m is positive 1 for mathematically representing an embodiment using the fan blades 14 followed by the OGVs 46 as is conventionally known. For other embodiments of the invention, the value of the integer k may be conventionally selected. Also in the example illustrated in FIG. 3, N=2360 rpm; $R_t$=3.05 meters; $A_o$=344 meters/sec; and $V_a$=172 meters/sec were used in plotting the exemplary cut-off ratios K.

In order to achieve cut-off for the first harmonic spinning mode tone at the blade passing frequency BPF (i.e. n=1), the graph indicates that the number of vanes V should be greater than about 76 which represents the crossing of the first curve 58 with the K=1 line.

However, at V=76, the value of the cut-off ratio K for the second harmonic, i.e. second curve 60 is greater than 1, and very large indicating substantial propagation of the corresponding spinning mode tone associated therewith. In accordance with one conventional practice, in order to obtain cut-off of the second harmonic spinning mode tone, the number of vanes V should be greater than or equal to 2nB (i.e. 2×2×34=136), which is an impractically large number of vanes V for use with 34 blades.

In accordance with the present invention, the number of vanes V may be selected for a predetermined number of blades B from a graph such as that shown in FIG. 3, for example, for minimizing the cut-off ratios K for two or more, and if possible all the harmonics n. This may be accomplished, for example, by selecting the vane number V so that the cut-off ratios K for at least two harmonic numbers n are substantially equal, which occurs at the intersection of two of the cut-off ratio curves. In other words, the number of vanes V may be relative to a predetermined number of blades B for obtaining simultaneously substantially equal values of the cut-off ratios for at least two of the harmonic numbers n.

FIG. 3 illustrates, for example, that the cut-off ratio K for the first harmonic number n having a value of n=1 may be maintained at a value less than 1.0 for obtaining cut-off of the fundamental spinning mode tone while also reducing the values of the cut-off ratios K associated with the higher harmonics for reducing the overall spinning mode noise generated by the fan blades 14. By selecting the number of vanes V=82 instead of 76, the relatively small additional number of vanes results in a substantial reduction in the second harmonic spinning mode tone cut-off ratio K represented by the second curve 60 which would otherwise occur if 76 of the OGVs 46 were used. As a general observation, relative contributions to the overall spinning mode noises generated by the fan blades 14 and the OGVs 46 decreases for each higher order harmonic spinning mode tone. Accordingly, although the third and higher harmonics spinning mode tones shown in FIG. 3 by the curves 62, 64, 66, and 68 increase in magnitude as the number of vanes V increases from 76, the cut-off ratio K, and corresponding spinning mode tone, for the second harmonic spinning mode tone represented by the second curve 60 decreases. The intersection of the second and third curves 60 and 62 for the two harmonic numbers $n=2$ and $n=3$, represented by the condition A illustrated in FIG. 3, represents a maximum value of the cut-off ratios K of all the harmonic spinning mode tones shown in FIG. 3 (i.e. $n=1, 2, 3, 4, 5$, and 6) for $V=82$ vanes. This example shows that selecting the number of vanes $V=82$ gives the lowest and equal values of the cut-off ratio K for both the second and third harmonics (i.e. $n=2$ and $n=3$), with all higher harmonics (i.e. $n>3$) having significantly lower values of the cut-off ratio K.

Accordingly, a fundamental feature of the present invention is selecting the number of vanes V for obtaining simultaneously either equal or substantially equal values of the cut-off ratios K for at least two of the harmonic numbers n, which two numbers may either be consecutive such as $n=2$ and $n=3$ as described above or non-consecutive as discussed in more detail below. In either case, the selection represents the intersection of at least two of the cut-off ratio curves which necessarily results in a local minimum value of the cut-off ratio K since choosing either a fewer number or greater number of vanes V necessarily results in an increase in at least one of the cut-off ratios K represented by the two intersecting curves. Since a whole number of vanes V must be selected in designing the engine 10, the number of vanes V is selected to be at the intersection of the two curves, as represented for example by condition A in FIG. 3, or as close thereto as possible or desirable for obtaining a whole number of vanes V, which is preferably an even whole number of vanes V for ease of manufacture according with present conventional design practice. Of course, an odd number of vanes V could also be used if desired.

Also in accordance with the present invention, for the condition A indicated in FIG. 3 representing the intersection of the second and third harmonic ($n=2$ and $n=3$) cut-off ratios K, an optimum and unique value of the number of vanes V has been discovered. The value is optimum for the condition A since the value of the cut-off ratio K for the first harmonic spinning mode tone for $n=1$ is below 1.0, and the cut-off ratios K (i.e. $K=6.4$) associated with the intersecting second and third curves 60 and 62 represent a maximum value of at least the six harmonics illustrated in FIG. 3 at the selected vane number $V=82$, with it being understood that the cut-off ratios K for the higher harmonics ($n>6$) which are not shown will also typically be less than that maximum value.

The value of the number of vanes V for the condition A is unique since it may be analytically determined by equating the cut-off ratios K represented by equation 4 for the two harmonic numbers $n=2$ and $n=3$ and resolving for the vane-blade ratio V/B as follows:

$$\frac{2BM_t}{|2B - kV|(1 - M_a^2)^{\frac{1}{2}}} = \frac{3BM_t}{|3B - kV|(1 - M_a^2)^{\frac{1}{2}}} \quad (5)$$

$$2|3B - kV| = 3|2B - kV| \quad (6)$$
$$4(9B^2 - 6BkV + K^2V^2) = 9(4B^2 - 4BkV + K^2V^2) \quad (7)$$
$$36B^2 - 24BkV + 4K^2V^2 = 36B^2 - 36BkV + 9K^2V^2 \quad (8)$$
$$V/B = 12/5k = 2.4 \quad (9)$$

From an examination of equations (5)–(9), it may be appreciated that the crossing of the second and third curves 60 and 62 of FIG. 3 is a function only of the harmonic number n and the spinning mode number m for a given number of blades B, and is independent of the absolute magnitude of the cut-off ratios K as well as independent of the blade tip speed ($M_t$), flow speed ($M_a$), rotational speed N, blade tip radius $R_t$, and the duct sonic velocity $A_o$. The resulting vane-blade ratio V/B simply reduces to 12/5 k, with k being conventionally chosen to be equal to positive 1 for the fan assembly embodiment of the invention illustrated in FIG. 1 which results in a unique vane-blade ratio V/B value of 2.4. Notice in FIG. 3 that the intersection of the second and third curves 60 and 62 occurs most closely at about a vane number $V=82$ which when divided by the number of blades $B=34$ used for generating the graph of FIG. 3, results in the vane-blade ratio V/B of 2.41. Accordingly, the vane-blade ratio V/B for condition A may be determined either by plotting the graph as illustrated in FIG. 3, or analytically as represented by equations (5)–(9), with the analytical determination thereof indicating that the value is unique.

Accordingly, for the condition A disclosed above, the number of vanes V may be selected from the given predetermined number of blades B so that the vane-blade ratio V/B is equal to or substantially equal to 2.4. Of course, the closest whole number of vanes V must be used in a practical application since fractions of blades are not feasible, and in the preferred embodiment, the closest even whole number of blades B is preferred for ease of manufacture based on conventional manufacturing techniques of assembling the vanes, such as the OGVs 46 in the engine 10. Of course, odd whole numbers of vanes V could also be used if desired.

In accordance with another feature of the present invention, if the requirement to enforce cut-off of the fundamental BPF spinning mode tone, i.e. $K<1.0$ for $n=1$, is removed, then an alternate acoustically optimal and unique vane-blade ratio V/B may also be obtained which gives equal, or substantially equal, values for both the fundamental and second harmonic ($n=1$ and $n=2$) cut-off ratios K as shown at condition B in FIG. 3. In this embodiment, the two consecutive harmonic numbers are $n=1$ and $n=2$ associated with the respective first and second curves 58 and 60 which result not only in a local minimum or smallest cut-off ratio K for both the first and second harmonic spinning mode tones simultaneously, but which value is also a maximum value of the several cut-off ratios K at the number of vanes V associated therewith, i.e. 45, for the number of blades $B=34$. The corresponding vane-blade ratio V/B is unique and is equal to 4/3, and may be similarly obtained as described above for equations (5)–(9) by equating instead the cut-off ratio K of equation (4) for the harmonic numbers $n=1$ and $n=2$ and resolving for the vane-blade ratio V/B, again utilizing a positive 1 value for the integer constant k for the fan assembly illustrated in FIG. 1. Again, this unique vane-blade ratio V/B is dependent solely on the harmonic number n and the spinning mode number m for the given integer k value of 1.

Although the cut-off ratio K for the fundamental harmonic spinning mode tone represented by the first curve 58 is no longer less than 1.0, it has a relative minimum value equal to about 3.8 for the intersection of the first and second curves 58 and 60, with the respective cut-off ratios K for the higher harmonic spinning mode tones represented by curves 62, 64, 66, and 68 being significantly lower relative thereto. This alternative design may be used in the engine 10 illustrated in FIG. 1 if the rotor-to-stator axial spacing S is relatively large so that sufficient axial length is provided inside the nacelle 44 for allowing the liner 56 to effectively suppress the spinning mode noises being propagated therein. For example, and referring to FIG. 2, each of the fan blades 14 ahs a root chord, or length, between the leading and trailing edges of the root 38 with the axial projection thereof designated C, and the ratio of the axial distance S between the trailing edges of the blades 14 and the leading edges of the OGVs 46 divided by the root chord axial projection C, i.e. S/C, is preferably greater than about 1.5 to ensure sufficient wake decay and effective suppression of the spinning mode harmonic tones by the liner 56.

Another alternative acoustically optimum and unique vane-blade ratio V/B is represented in FIG. 3 at condition C which represents the intersection of two of the cut-off ratio curves wherein the two harmonic numbers n are non-consecutive, for example n=1 and n=3. This embodiment may be utilized, for example, if the requirement to enforce cut-off of the first harmonic spinning mode tone, i.e. K<1.0 for the first curve 58, is removed, and the second harmonic spinning mode tone is determined either analytically or by test to not be a strong contributor to the overall fan noise spectrum generated by the engine 10. Note that in FIG. 3, the intersection of the first and third curves 58 and 62 results in a cut-off ratio K which is less than that associated with the second harmonic spinning mode tone associated with the second curve 60. The condition C occurs at a number of vanes V equal to 51, which may be used in the engine 10 illustrated in FIG. 1 providing that the second harmonic spinning mode tone is not a strong contributor to the total noise and may be effectively attenuated by the sound suppression liner 56.

Again, the unique value of the vane-blade ratio V/B may be obtained as was done above for equations (5)-(9) by equating the cut-off ratios K contained in equation (4) using harmonic numbers n=1 and n=3, and selecting a positive 1 value for the integer k. The unique vane-blade ratio V/B of 1.5 results in 51 vanes for the given 34 blades.

The selection of the specific vane-blade ratio V/B for a particular design application based on either of the conditions A, B or C as disclosed above as examples, depends on the relative magnitude or amplitude of the respective spinning mode tones associated with the fundamental, second and third harmonics, relative to the overall fan noise spectrum propagating from the nacelle 44. Accordingly, for any given design application, an appropriate vane-blade ratio V/B may be selected in accordance with the invention at the exemplary conditions A, B, or C or at alternate conditions all of which have the common aspect in accordance with the present invention of having the stator vane number V selected for a given blade number B for obtaining equal or substantially equal values of the cut-off ratios K for at least two of the harmonic numbers n.

Figure 2:
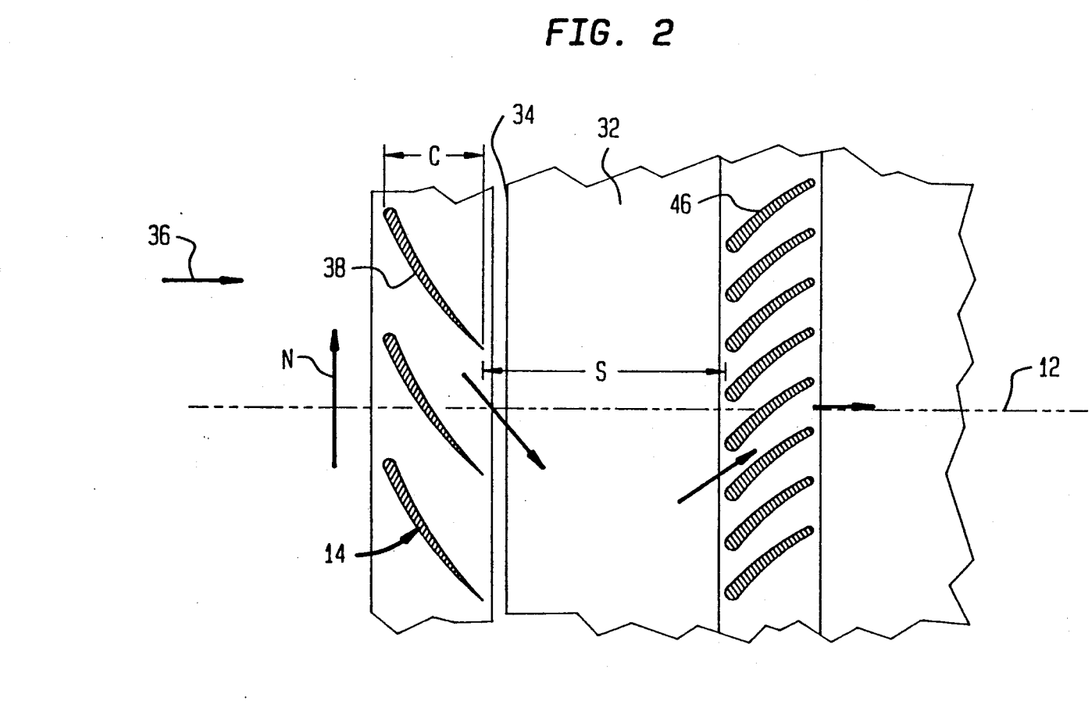
FIG. 2 is a radial sectional view of a portion of the fan assembly illustrated in FIG. 1 taken along line 2—2.
Figure 4:
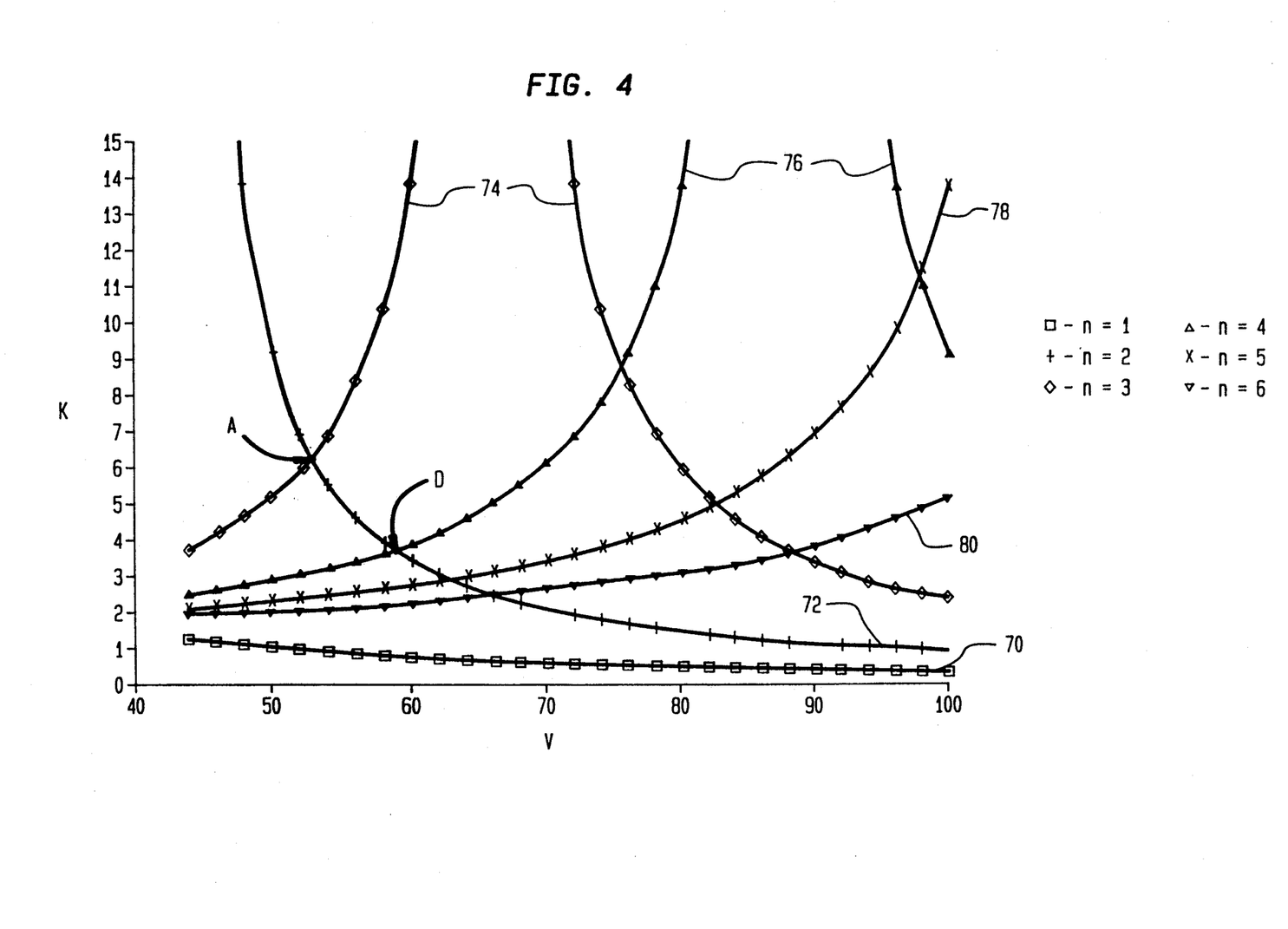
FIG. 4 is a graph plotting cut-off ratio K versus vane number V for six harmonic spinning modes for 22 rotor blades.

Illustrated in FIG. 4 is another graph plotting the cut-off ratio K versus the vane number V in accordance with a preferred embodiment of the present invention having 22 fan blades 14 in the engine 10 illustrated in FIG. 1. FIG. 4 represents operation of the engine 10 at takeoff, with the engine 10 powering an aircraft (not shown), wherein the takeoff rotational speed N is 2360 rpm and the blade tip mach number $M_t$, is equal to 1.093 for the fan blades 14 having a radius $R_t$ equal to 3.05 meters, the flow mach number $M_a$ is 0.5, the fan airflow duct velocity $V_a$ equals 172 meters/sec, and the duct sonic velocity $A_o$ equals 344 meters/sec. Again, first, second, third, fourth, fifth, and sixth curves 70, 72, 74, 76, 78, and 80 are illustrated in FIG. 4 which represent the respective cut-off ratios K associated with the respective first, second, third, fourth, fifth, and sixth harmonic spinning mode tones. The analogous condition A representing the intersection of the second and third curves 72 and 74 is shown which occurs at a number of stator vanes V equal to about 52.8 for the number of blades B equal to 22. As disclosed above, the unique vane-blade ratio V/B for condition A is equal to 2.4. Since 52.8 is not a whole number, a next whole number such as either 52 or 53 may be selected. However, 54 stator vanes 46 are preferably selected to ensure that the cut-off ratio K for the fundamental harmonic spinning mode tone associated with the first curve 70 is clearly less than 1.0 and, an even number of vanes, i.e. OGVs 46, is selected for ease of manufacture. Also in the preferred embodiment as illustrated in FIGS. 1 and 2, the OGVs 46 are spaced axially downstream from the fan blades 14 at a distance S so that the axial distance S divided by the root chord axial projection C is greater than about 1.5, and for example is 2.0, to help ensure that the higher harmonic spinning mode tones may decay appreciably inside the nacelle 44 due to the sound suppression liner 56.

Accordingly, by selecting the vane-blade ratio V/B for obtaining a relative minimum cut-off ratio K for the second and third harmonic spinning mode tones, for example, at least one of the harmonic cut-off ratios K has a value less than it otherwise would if the number of vanes V were selected at a point away from the condition A, which will reduce the magnitude of the harmonic spinning mode tone within the overall noise spectrum. For example, a minimum of about 50 vanes are required for 22 blades to ensure that the cut-off ratio K for the fundamental harmonic spinning mode tone represented by the first curve 70 is below 1.0. Correspondingly, the second harmonic cut-off ratio K represented by the second curve 72 has a relatively high value of about 9.2, and the third harmonic cut-off ratio K has a smaller value of about 5.2 for 50 vanes. Since the magnitude of contribution to the overall noise spectrum decreases as the harmonic number increases, the noise attributable to the second harmonic associated with the second curve 72 is substantially greater than the noise contributed by the third harmonic associated with the third curve 74. By selecting the condition A having about 54 vanes instead of only 50 vanes, the small increase in the number of vanes substantially reduces the second harmonic cut-off ratio K from 9.2 to 6.4 while only slightly increasing the value of the third harmonic cut-off ratio K from 5.2 to 6.4. This contributes to an overall reduction in the noise spectrum propagating from the engine 10 during operation.

Furthermore, by reducing the magnitude of the second harmonic cut-off ratio K to that of the third harmonic cut-off ratio K, the sound suppression liner 56 may be tailored for suppressing equally well both the second and third harmonic spinning mode tones, instead of primarily either one or the other.

Yet further, relatively low, (i.e. close to 0 values of the spinning mode number m) spinning mode interactions are avoided, which thus prevents the long-duration tone levels which would otherwise occur and which are not affectively suppressed by the liner 56. For condition A wherein the second and third harmonic curves 72 and 74 intersect, the second and third harmonic spinning mode numbers m are maximized.

Yet further, designing the fan assembly for operation near the intersection of two of the harmonic cut-off ratio K curves maintains cut-off, at least for those two curves, over a relatively wider range of operation of the fan speed N.

Referring again to FIG. 4, it should be noted that in this embodiment of the invention having 22 fan blades 14, the condition B wherein the first and second harmonic cut-off ratio curves 70 and 72 intersect does not occur below 100 vanes, and neither does the condition C wherein the first and third harmonic cut-off ratio curves 70 and 74 intersect. However, FIG. 4 illustrates six other intersections of harmonic cut-off ratio curves such as the second and fourth curves 72 and 76 associated with harmonic numbers n=2 and n=4, i.e. condition D, which is the next intersection at a higher vane number V than that associated with condition A, which occurs at V equal to about 59.

More specifically, the unique vane-blade ratio V/B associated with the intersection of the second and fourth curves 72 and 76 may again be obtained by equating the cut-off ratios K of equation (4) for harmonic numbers n=2 and n=4 which may be resolved as was done for equations (5)-(9) to result in the ratio V/B=8/3=2.667 for a positive 1 value of the integer k.

Using this unique value of the ratio V/B for the 22 blades of FIG. 4, results in V being equal to 58.7. Accordingly, the number of vanes V, i.e. OGVs 46 could also be the next even whole number 58 which is only four more than the 54 blades selected for condition A. At the condition D, all of the harmonic cut-off ratios K illustrated in FIG. 4 are less than those associated with those for the condition A except for the third harmonic cut-off ratio K. In a preferred embodiment of the invention, either condition A having 54 OGVs 46 or the condition D having 58 OGVs 46 may be selected depending upon which results in the lowest overall magnitude of noise propagating from the nacelle 44 during operation at the condition of interest.

Analysis predicts that the condition A embodiment having 54 OGVs 46 and 22 fan blades 14 will result in a significant reduction in magnitude of overall noise from the nacelle 44 during operation when compared with a conventional fan assembly having 38 fan blades and 80 OGVs (V/B=2.1). The analytical predictions were confirmed by a 1/5 scale model wind tunnel test of the fan assembly illustrated in FIG. 1 which measured noise for all spinning mode harmonics up to harmonic number n=6.

Since it is also conventionally known that a vane-to-blade ratio of 4/3 may be used under certain conditions, the present invention preferably excludes a V/B ratio of 4/3, except as specifically described above. And, therefore, the two harmonic numbers n for obtaining substantially equal values of the respective cut-off ratios are those preferably associated with the intersecting cut-off ratio curves for harmonic number pairs excluding n=1 and n=2 associated with the V/B ratio 4/3. These harmonic number pairs are preferably selected from the group of harmonic number pairs including n=1 and n=3 associated with V/B=1.5; n=2 and n=3 associated with V/B=2.4; n=2 and n=4 associated with V/B=8/3; and other harmonic number pairs, the product of which harmonic numbers n is greater than 2, i.e. greater than n=1 times n=2 (1×2), associated with V/B=4/3. For example, the product of the harmonic number pairs described above are 3, 6, and 8, respectively.

Accordingly, the present invention provides a new method for selecting the number of stator vanes to be used with a given number of rotor blades for reducing the magnitude of harmonic spinning mode tones generated during operation, and make them more amenable to suppression by the sound suppression liner 56 for further reducing the magnitude thereof. Although the invention has been described with respect to the exemplary fan assembly illustrated in FIG. 1, including the fan blades 14 and the OGVs 46 surrounded by the nacelle 44, other embodiments of the invention may be practiced from the teachings herein by those skilled in the art including, for example, other fan assemblies, which includes compressors, having rotor blades and stator vanes.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine fan assembly comprising:
   a number B of circumferentially spaced rotor blades;
   a number V of circumferentially spaced stator vanes spaced axially from said blades;
   an annular duct surrounding said blades and said vanes and having an inlet for receiving air and an outlet for discharging at least a portion of said air upon compression by said blades, said compressed air generating spinning mode tones each of which propagates above a respective cut-off ratio of 1.0 and decays below said cut-off ratio of 1.0 at a plurality of respective blade passing frequency harmonic numbers n; and
   said vane number V relative to said blade number B being effective for obtaining substantially equal values of said cut-off ratio for at least two of said harmonic numbers n, said two harmonic numbers n having a product greater than 2.

2. A fan assembly according to claim 1 wherein said cut-off ratio at said two harmonic numbers n has a maximum value.

3. A fan assembly according to claim 1 wherein said two harmonic numbers n are consecutive.

4. A fan assembly according to claim 3 wherein said two consecutive harmonic numbers are n=2 and n=3.

5. A fan assembly according to claim 4 wherein said vane number V divided by said blade number B is equal to about 2.4.

6. A fan assembly according to claim 5 wherein said cut-off ratio at said harmonic number n=1 is less than 1.0.

7. A fan assembly according to claim 6 wherein said blade number B is 22 and said vane number V is 54.

8. A fan assembly according to claim 7 wherein:
said cut-off ratio is proportional to nB/|m| and tip speed mach number of said fan blades relative to flow speed mach number of said air through said duct;
m=nB−kV; and
k is a positive or negative integer.

9. A fan assembly according to claim 1 wherein said two harmonic numbers n are non-consecutive.

10. A fan assembly according to claim 9 wherein said two harmonic numbers are n=1 and n=3.

11. A fan assembly according to claim 10 wherein said vane number V divided by said blade number B is equal to about 1.5.

12. A fan assembly according to claim 9 wherein said two harmonic numbers are n=2 and n=4.

13. A fan assembly according to claim 12 wherein said vane number V divided by said blade number B is equal to about 8/3.

14. A gas turbine engine fan assembly comprising a number B of circumferentially spaced rotor blades, a number V of circumferentially spaced stator vanes spaced axially from said rotor blades, and a ratio V/B of said number of vanes V divided by said number of blades B being selected from the group including 2.4, 1.5 and 8/3.

* * * * *